US010397684B2

(12) United States Patent
Chang et al.

(10) Patent No.: US 10,397,684 B2
(45) Date of Patent: Aug. 27, 2019

(54) WIRELESS SPEAKER SYSTEM

(71) Applicant: VOXX INTERNATIONAL CORPORATION, Hauppauge, NY (US)

(72) Inventors: Arthur Chang, San Bernardino, CA (US); Chung Lung Chang, San Bernardino, CA (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 15/398,983

(22) Filed: Jan. 5, 2017

(65) Prior Publication Data

US 2017/0195769 A1 Jul. 6, 2017

Related U.S. Application Data

(60) Provisional application No. 62/274,819, filed on Jan. 5, 2016.

(51) Int. Cl.
*H04R 1/10* (2006.01)
*H04B 7/00* (2006.01)

(52) U.S. Cl.
CPC ......... *H04R 1/1016* (2013.01); *H04R 1/1025* (2013.01); *H04R 1/1041* (2013.01); *H04R 2420/07* (2013.01); *H04R 2420/09* (2013.01)

(58) Field of Classification Search
CPC .. H04R 2420/07; H04R 1/1016; H04R 5/033; H04R 25/552; H04R 1/1008;
(Continued)

(56) References Cited

U.S. PATENT DOCUMENTS 4,756,528 A 7/1988 Umashankar
5,775,762 A 7/1998 Vitito
(Continued)

FOREIGN PATENT DOCUMENTS

JP 6415479 1/1989
JP 194049 4/1989
(Continued)

OTHER PUBLICATIONS

Claim Construction Order, U.S. District Court, Central District of California, *Johnson Safety, Inc.* (Plaintiff) v. *Voxx International Corporation; Voxx Electronics Corporation; and Invision Automotive Systems Inc.* (Defendants), Case No. 5: 14-cv-02591-ODW(DTB), Nov. 16, 2016, 36 pgs.
(Continued)

*Primary Examiner* — Norman Yu
(74) *Attorney, Agent, or Firm* — F. Chau & Associates, LLC

(57) ABSTRACT

Wireless speaker systems and methods for synchronous audio playback. Speaker systems can comprise more than one wireless speaker assembly, such as wireless earphones, in serial communication with an audio source device, such as a smartphone. Separate audio rendering by each wireless speaker assembly and synchronization of audio playback by imposing a fixed latency from an output timestamp associated with the audio source data, and rate matching the sample allow for tightly synchronized playback of stereo audio at low latency.

18 Claims, 6 Drawing Sheets

(58) Field of Classification Search

CPC ........ H04R 2227/003; H04R 2227/005; H04R 3/12; H04R 1/1025; H04R 1/1041; H04R 2420/09; H04M 1/6066; H04M 2250/02; H04L 43/106; H04S 1/005; H04W 56/0015

USPC ......... 381/74, 79, 11, 311, 77, 80; 455/41.2, 455/575.2; 704/500

See application file for complete search history.

(56) References Cited

U.S. PATENT DOCUMENTS

| | | | | |
|---|---|---|---|---|
| 5,946,055 | A | 8/1999 | Rosen | |
| D413,856 | S | 9/1999 | Scribner | |
| 6,056,364 | A | 5/2000 | De Filippo | |
| 6,115,086 | A | 9/2000 | Rosen | |
| 6,124,902 | A | 9/2000 | Rosen | |
| 6,125,030 | A | 9/2000 | Mola et al. | |
| 6,157,418 | A | 12/2000 | Rosen | |
| 6,199,810 | B1 | 3/2001 | Wu et al. | |
| 6,246,449 | B1 | 6/2001 | Rosen | |
| 6,330,337 | B1 | 12/2001 | Nicholson et al. | |
| 6,364,390 | B1 | 4/2002 | Finneman | |
| D469,413 | S | 1/2003 | To et al. | |
| 6,871,356 | B2 | 3/2005 | Chang | |
| 6,928,654 | B2 | 8/2005 | Tranchina et al. | |
| 7,036,879 | B2 | 5/2006 | Chang | |
| 7,044,546 | B2 | 5/2006 | Chang | |
| 7,050,124 | B2 | 5/2006 | Schedivy | |
| 7,245,274 | B2 | 7/2007 | Schedivy | |
| 7,267,402 | B2 | 9/2007 | Chang | |
| 7,379,125 | B2 | 5/2008 | Chang | |
| 7,448,679 | B2 | 11/2008 | Chang | |
| 7,597,393 | B1 | 10/2009 | Tuccinardi et al. | |
| 7,839,355 | B2 | 11/2010 | Lavelle et al. | |
| 7,894,003 | B2 | 2/2011 | Chang | |
| 8,585,140 | B2 | 11/2013 | Chang | |
| 9,114,745 | B2 | 8/2015 | Schedivy | |
| 2005/0027385 | A1* | 2/2005 | Yueh | G10H 1/0041 700/94 |
| 2008/0226094 | A1* | 9/2008 | Rutschman | H04M 1/6066 381/79 |
| 2008/0291863 | A1* | 11/2008 | Agren | H04J 3/0632 370/315 |
| 2009/0191920 | A1* | 7/2009 | Regen | H04M 1/05 455/566 |
| 2012/0196540 | A1* | 8/2012 | Pearce | G06F 1/163 455/41.3 |
| 2013/0266152 | A1* | 10/2013 | Haynie | H04R 5/033 381/80 |
| 2014/0031122 | A1* | 1/2014 | Peng | A63F 13/00 463/35 |
| 2014/0161274 | A1* | 6/2014 | Singamsetty | H04R 1/1041 381/74 |
| 2016/0073188 | A1* | 3/2016 | Linden | H04R 1/1025 381/309 |

FOREIGN PATENT DOCUMENTS

| | | |
|---|---|---|
| JP | 2144242 | 6/1990 |
| JP | 2158437 | 6/1990 |
| JP | 640021 | 10/1994 |
| JP | 741401 | 9/1995 |
| JP | 11151986 | 6/1999 |
| KR | 19990027444 | 7/1999 |
| KR | 20000014983 | 7/2000 |
| KR | 200207307 | 10/2000 |
| KR | 2002556470 | 12/2001 |
| TW | 483319 | 4/2002 |
| WO | 0038951 | 7/2000 |

OTHER PUBLICATIONS

Stipulated Constructions of Claim Terms, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Dec. 1, 2016, 6 pgs.

Plaintiff's Opening Claim Construction Brief for Plaintiff's Patents-in-Suit, U.S. District Court for the Central District of Califomia, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Jan. 8, 2016, 31 pgs.

Parties' Final Joint Claim Chart, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5: 14-cv-02591-ODW(DTBx), Jan. 8, 2016, 6 pgs.

Parties' Proposed Constructions and Supporting Evidence for Disputed Claim Terms of the Patents in Suite, Ex. A to Final Joint Claim Chart, Case No. 5:14-cv-02591-ODW-DTB, Jan. 8, 2016, 37 pgs.

Plaintiff's Reply Claim Construction Brief for Plaintiff's Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW(DTB), Jan. 25, 2016, 18 pgs.

Plaintiff's Responsive Claim Construction Brief for Defendants' Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Jan. 19, 2016, 30 pgs.

Voxx's Opening Claim Construction Brief, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-2591-ODW-DTB, Jan. 8, 2016, 29 pgs.

Voxx's Responsive Claim Construction Brief, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-2591-ODW(DTBx, Jan. 19, 2016, 11 pgs.

Voxx's Reply to Johnson Safety's Response to Voxx's Opening Claim Construction Brief, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-2591-ODW-DTB, Jan. 25, 2016, 17 pgs.

Joint Appendix of Extrinsic Evidence, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-02591-ODW (DTBx), Jan. 25, 2016, 4 pgs.

USI Extrinsic Evidence: Exhibits C-H, Exhibit O, Exhibit Q, Jan. 25, 2016, Case No. 5:14-cv-02591-ODW-DTB, 74 pgs.

Voxx Extrinsic Evicence: Exhibit A, Jan. 25, 2016, Case No. 5:14-cv-02591-ODW-DTB, 15 pgs.

Petition for Inter Partes Review of U.S. Pat. No. 8,585,140 Under 35 U.S.C. 311-319 and 37 C.F.R. 42, *Voxx International Corporation* (Petitioner) v. *Johnson Safety, Inc.* (Patent Owner), U.S. Patent and Trademark Office Before the Patent Trial and Appeal Board, Dec. 30, 2016, 49 pgs.

Parties' P.R. 4-3 Joint Claim Construction and Prehearing Statement with Exhibits A.1-E.2, District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-av-02591-ODW(DTBx), Nov. 23, 2015, 98 pgs.

Voxx's Preliminary Invalidity Contentions with Exhibits A-E, U.S. District Court for the Central District of California, *Johnson Safety,*

(56) References Cited

OTHER PUBLICATIONS

*Inc.* (Plaintiff) v. *Voxx International Corporation; Voxx Electronics Corporation; and Invision Automotive Systems Inc.* (Defendants), Case No. 5:14-cv-02591-ODW(DTBx), Sep. 28, 2015, 196 pgs.
VOXX International Corporation's, et al. Notice of Service of Amended Invalidity Contentions, United States District Court for the Central District of California, *Johnson Safety, Inc.* (Plaintiff) v. *VOXX International Corporation, VOXX Electronics Corporation, and Invision Automotive Systems, Inc.*, Jan. 20, 2017, 7 pgs.
Grumet Popular Mechanics, "Digital Dreams in Sin City," by Tobey Grumet, May 2000, 6 pgs. (pp. 96-104).
Popular Mechanics, "Desktop Theater", by Steve Ditlea, Oct. 1999, 3 pgs. (pp. 88-91).
PC Magazine, "PC Buyer's Guide", Dec. 3, 2002, 2 pgs.
PC Magazine, "How to Network your Home", Apr. 8, 2003, pp. 106-112.
Audiovox Corporation, LCM56, Owner's Manual, 2002, 12 pgs.
Audiovox, LCM-5600NP, 5.6" Active Matrix LCD Monitor, Owner's Manual, 2001, 8 pgs.
Audiovox Electronics Corp., LCM5869NP & LCM7069NP Remote Controlled Color Display Monitor, Installation and Owner's Manual, Mar. 27, 2002, 22 pgs.
Audiovox Electronics Corp., LCM5043NP & LCM5643NP Remote Controlled Color Display Monitor with Headphone Jack, Installation and Owner's Manual, Mar. 25, 2002, 20 pgs.
Audiovox, LCM-4000, 4" Active Matrix LCD Monitor, Owner's Manual, 2000, 8 pgs.
Audiovox Corporation, LCM-0565, 5.6" Active Matrix LCD Monitor, Owner's Manual, 2000, 8 pgs.
Audiovox Corporation, LCM-0505, 5" Active Matrix LCD Monitor, Owner's Manual, 2000, 8 pgs.
Audiovox Electronics Corp., LCM500NP 5 Inch Monitor with 2 Video Input Capability, Installation and Operation Manual, 2001, 16 pgs.

* cited by examiner

WIRELESS SPEAKER SYSTEM

RELATED APPLICATION

Under provisions of 35 U.S.C. § 119(e), Applicant claims the benefit of U.S. Provisional Application No. 62/274,819, filed Jan. 5, 2016, which is incorporated herein by reference in its entirety.

BACKGROUND

Field of the Invention

This application relates to wireless speaker systems that reliably pair wireless speakers, including wireless earphones, to an audio source device for synchronous audio playback of audio data.

Description of the Related Art

Wireless speaker systems utilizing wireless connections between an audio source device and wireless speakers are known in the art. Such wireless speaker systems have provided greater ease of installation, eliminated the nuisance of tangled earphone wires, and provided the ability to integrate music into daily activities where wired connections are not feasible without hassle. However, known wireless speaker systems and various components thereof are currently limited in their ability to reliably and flexibly connect to an audio source. Known wireless systems also fail to provide acceptably synchronized audio playback through the wireless speakers, a problem which is compounded in the implementation of stereo sound, which employs subtle temporal variations to achieve a spatial audio effect. Various other limitations and disadvantages of known wireless speaker systems are presented and addressed herein.

SUMMARY

Certain embodiments of the instant disclosure provide a wireless speaker system. The system comprises a first wireless earphone comprising a speaker and a wireless transceiver configured to receive timestamped audio source data from an audio source device, generate synchronization data based on the timestamped audio source data, and transmit the audio source data and synchronization data to a second wireless earphone. The system also comprises a second wireless earphone comprising a speaker and a wireless transceiver configured to receive timestamped audio source data and synchronization data from the first wireless earphone.

Certain embodiments of the instant disclosure provide a method of synchronously playing audio through a plurality of wireless speaker assemblies. The method comprises pairing a first wireless speaker assembly to an audio source device; pairing a second wireless speaker assembly to the first wireless speaker assembly, wherein the second wireless speaker assembly is designated the slave in a master/slave configuration with the first wireless speaker assembly; receiving, at the first wireless speaker assembly, audio source data from an audio source device; transmitting the received audio data to the second wireless speaker assembly; separately rendering the received audio data and the transmitted audio data on the first and second wireless speaker assemblies, respectively; and synchronizing playback of transmitted audio data at the second wireless speaker assembly with that of received audio data at the first wireless speaker assembly. The synchronization step comprises delaying playback of received audio data at the first wireless speaker assembly and playback of transmitted audio data at the second wireless speaker assembly by a synchronization delay fixed relative to an output timestamp embedded in the audio source data and matching a sample playback rate of transmitted audio data at the second wireless speaker assembly to that of received audio data at the first wireless speaker assembly.

BRIEF DESCRIPTION OF THE DRAWINGS

Non-limiting and non-exhaustive examples are described with reference to the following figures.

DETAILED DESCRIPTION

Figure 1:
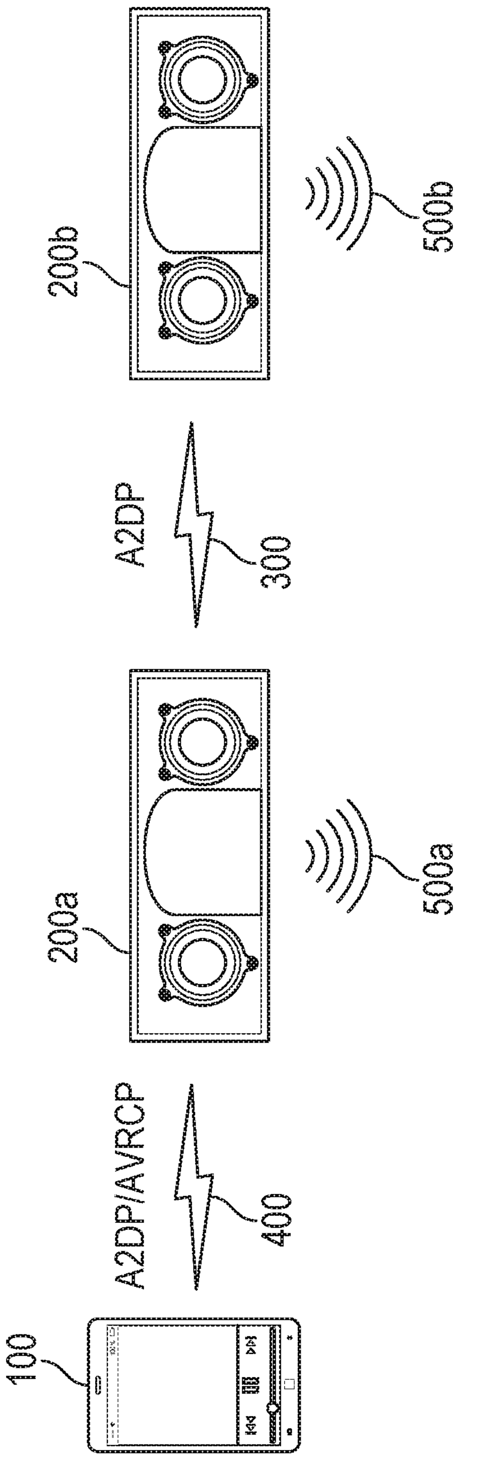
FIG. 1 is a general illustration of a wireless speaker system.

FIG. 1 illustrates an embodiment of a wireless speaker system comprising audio source device 100 in wireless communication with wireless speaker assembly 200*a*, which is in turn in wireless communication with wireless speaker assembly 200*b*. Audio source device 100 is not limited to a particular type of device, and can include, for example, a smartphone, a music server available through a wireless data access point, a laptop, a tablet, or any digital device configured to wirelessly transmit audio data. In certain embodiments, audio source device 100 is capable of transmitting stereo audio data comprising data associated with a left audio channel and a right audio channel. Further, audio source device 100 may be capable of compressing audio data for wireless transmission using any commonly known audio compression codec, including, but not limited to, MP3, WMA, TTA, and AAC.

Figure 7:
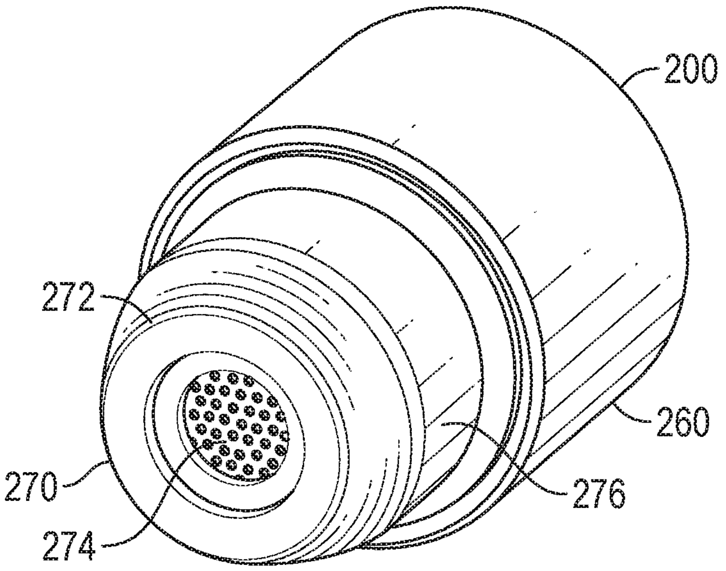
FIG. 7 is a three-dimensional rendering of a wireless earphone.
Figure 8:
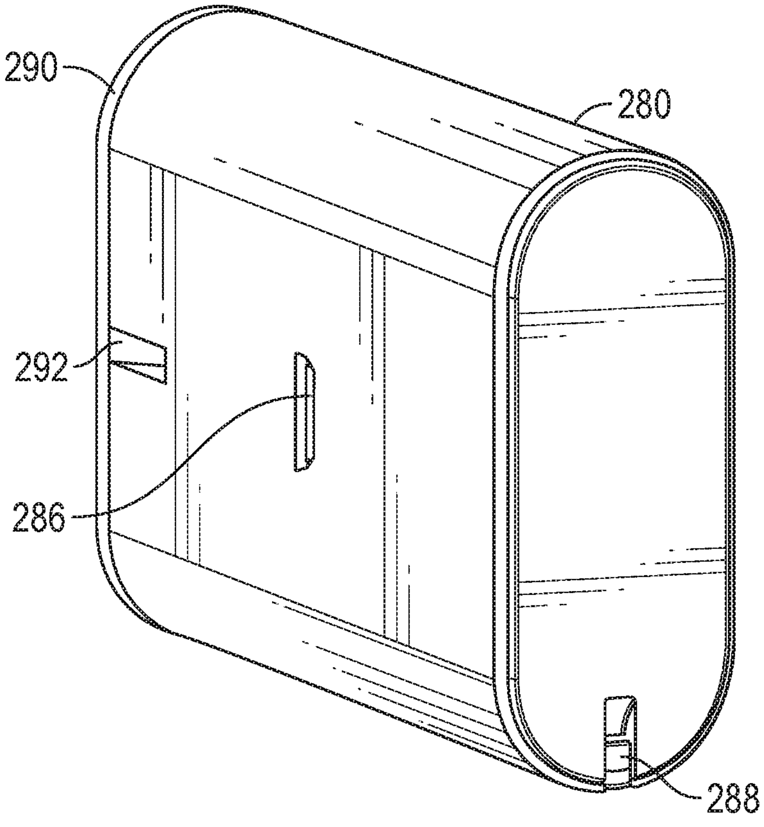
FIG. 8 is a three dimensional rendering of a storage case configured to store and recharge wireless earphones.

Similarly, wireless speaker assembly 200*a, b* broadly includes any speaker assembly able to wirelessly receive audio data and subsequently playback the audio data. However, wireless speaker assemblies of the invention are not restricted from optionally receiving audio data from a wired source. Accordingly, in certain embodiments, wireless speaker assembly 200 has a port to optionally receive audio source data from an audio source device through a wired connection. The port can accommodate any wired connection suitable for the transmission of audio data (e.g., a USB port, micro-USB port, stereo headphone jack, etc.). Thus, as depicted in FIG. 1, wireless speaker assembly 200*a, b* can be portable wireless speakers. Alternatively, as depicted in FIG. 7, wireless speaker assembly 200*a*, b can be wireless earphones, as depicted in FIG. 7. In embodiments where wireless speaker assembly 200 is a wireless earphone, the wireless earphone can generally take any shape suitable to allow the wireless earphone to seat comfortably in a user's ear. Further, the wireless earphone can be either interchangeable between the left and right ear, or specifically designed to fit the left or right ear. In one embodiment, wireless speaker assembly 200 is a wireless earphone comprising an external facing portion 260 and internal facing portion 270, relative to the user's ear, wherein internal facing portion 270 further comprises tapered edge 272 and rounded edge 276 to allow the earphone to seat comfortably within the ear. In certain embodiments, wireless earphone further comprises grating 274 to both protect the speaker and facilitate transmission of sound.

Figure 2:
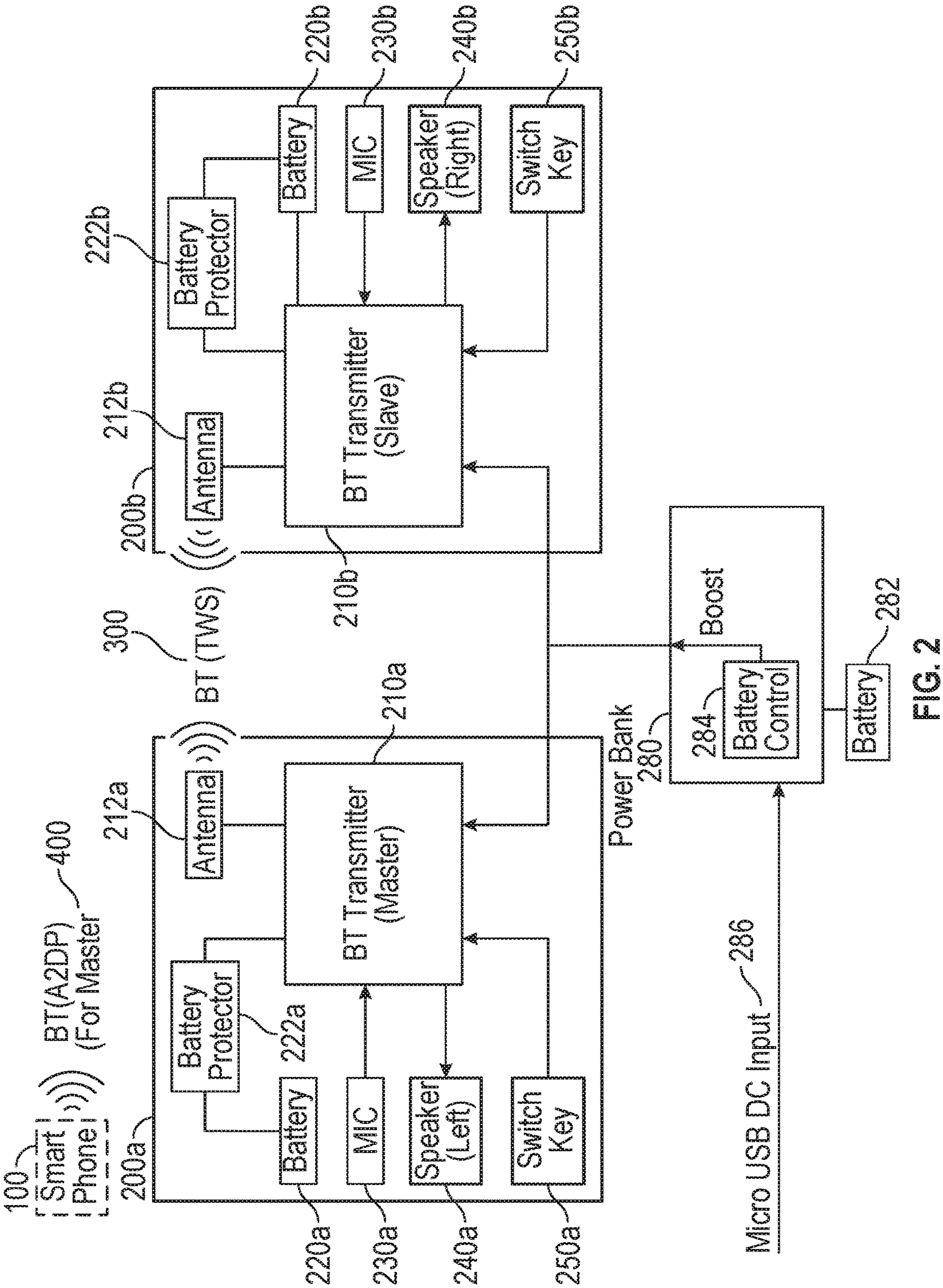
FIG. 2 is a schematic diagram of hardware components of a wireless speaker system and communication therebetween.
Figure 3:
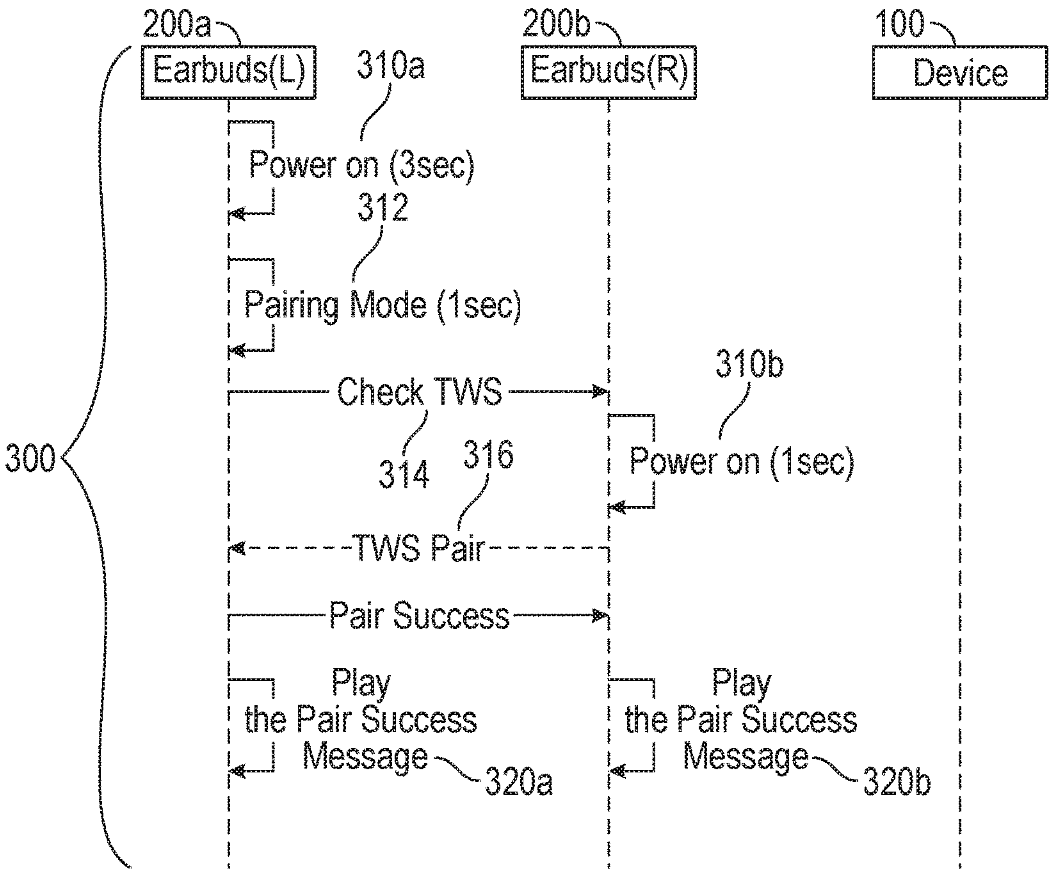
FIG. 3 is a flow diagram demonstrating a method for initially pairing a first wireless speaker assembly with a second wireless speaker assembly.

FIG. 2 presents, in part, a schematic diagram comprising internal components of wireless speaker assembly 200. Each wireless speaker assembly contains a wireless transceiver 210, further comprising antenna 212. The wireless transceiver 210 is not particularly limited to a certain type or class, though generally must be able to facilitate continuous wireless communication with two external devices. In certain embodiments, wireless transceiver 210 has hardware components required to meet a wireless communication standard, such as the Bluetooth v4.0 standard. Such hardware components can typically include a digital signal processor, radio, clock, audio interface, memory, and various optional inputs/outputs such as capacitive touch sensor inputs and microphone inputs. In certain embodiments, the digital signal processor of wireless transceiver 210 is an ultra-low power processor, allowing the wireless speaker assembly 200 to have a prolonged battery lifetime. Wireless transceiver 210 may also include a stereo codec having a plurality of audio channel inputs. As a singular example, the Bluecore® CSR8670 BGA chip satisfies the requirements of wireless transceiver 210.

Wireless speaker assembly 200 further comprises speaker battery 220. In some embodiments, the battery is a lithium ion battery, a lithium-ion polymer battery, or any other battery suitable for compact electronics applications. In certain embodiments, speaker battery 220 is accompanied by battery protection circuit 222, which maintains the battery within a minimum and maximum safe voltage and regulates the rate of charge. Wireless speaker assembly 200 may further comprise microphone 230 electrically coupled to wireless transceiver 210 and configured to relay microphone data to audio source device 100 such as is necessary to operate audio source device 100 in a hands-free mode (e.g., receiving incoming calls on a smartphone, adjusting volume). Wireless speaker assembly 200 also comprises speaker 240, generally capable of producing audible playback 500 from audio data received from audio source device 100, or alternatively, another wireless speaker assembly.

In certain embodiments, wireless speaker assembly 200 further comprises switch key 250. Switch key 250 can function as a user input as an on/off button, or any switch that is responsive to pressure, capacitive touch, or the like. Switch key 250 may be disposed on external facing portion 260 of a wireless earphone, so that the user may provide input to the wireless speaker system through wireless speaker assembly 200 without interruption. In certain embodiments, operation of switch key 250 can initiate the pairing of the wireless speaker assembly with another wireless speaker assembly or an audio source device. Switch key 250 may also allow the user to initiate power on and power off sequences, either individually or for a plurality of wireless speaker assemblies. Operation of switch key 250 may further allow the user to control audio source device 100 without interacting with audio source device 100 directly, such as to pause audio data, advance the track selection, adjust the volume, etc.

Wireless speaker assembly 200*a, b* can also be accompanied by storage case 280. In certain embodiments, storage case 280 comprises a plurality of molded compartments for storing wireless speaker assembly 200*a, b* (e.g., wireless earphones) in a stable position may further comprise a cap 290 that meets the case to close at cap notch 292, in order to protect stored wireless speaker assemblies 200*a, b* from dust and other debris, and further stabilize stored wireless speaker assemblies. In certain embodiments, storage case 280 comprises power bank battery 282 and battery control circuit 284, which are electrically coupled to speaker battery 220 when wireless speaker assemblies 200*a, b* are seated in the molded compartments of storage case 280. Thus, speaker battery 220 can be recharged simply by storing wireless speaker assemblies 200*a, b* in storage case 280, without further input from the user. Storage case 280 may also comprise power indicator 288 to indicate the charge state of speaker battery 220, power bank battery 282, or both. Storage case 280 may further comprise a power input port 286 to supply power bank battery 282 with DC power from a wired power source. Power input port 286 is not limited to a particular shape or style, but generally can be the same or different than a power input port on audio source device 100, such as a micro-USB port.

Referring back to FIG. 1, wireless communication between wireless speaker 200*a* and audio source device 100 can be established through source pairing sequence 400. Similarly, wireless communication between wireless speaker assembly 200*a* and wireless speaker assembly 200*b* can be established through speaker pairing sequence 300. In certain embodiments, wireless speaker assemblies 200 further establish a master/slave designation during the pairing process, which enables serial communication between audio source device 100 and each wireless speaker assembly 200. In such embodiments, the wireless speaker assembly to initiate pairing sequence 300 is designated as the master (e.g., 200*a* in FIG. 1), and the paired wireless speaker assembly is designated the slave (e.g., 200*b* in FIG. 1). The master/slave designation is important to the wireless speaker system as only the master wireless speaker assembly receives audio source data from the audio source device 100. The master wireless speaker assembly is also responsible for transmitting audio data to the slave wireless speaker assembly and synchronizing the resulting audible playback, as discussed in detail herein below. Thus, in certain embodiments, the slave wireless speaker assembly is not in direct communication with audio source device 100. The resulting serial configuration differs from known wireless speaker systems with a parallel configuration where several wireless speakers receive audio data from a single audio source device. Pairing of wireless speaker assemblies 200 can be restricted to pair only with certain devices, manufacturers, software versions, and the like.

Certain embodiments allow wireless speaker assembly 200 to accommodate pairings with two other devices. In the embodiment represented in FIG. 1, master wireless speaker assembly 200*a* is paired with audio source 100 and slave wireless speaker assembly 200*b*; however slave wireless speaker assembly 200*b* only has a single pairing. Therefore, in certain embodiments, slave wireless speaker assembly 200*b* can accommodate an optional communication link to a secondary audio source device. Where slave wireless speaker assembly 200*b* is paired with a secondary audio source device, the user can optionally reassign the master/ slave designation to allow slave wireless speaker 200*b* to act as the master and receive audio data from the secondary audio source device and transmit the received audio device to wireless speaker assembly 200*a*, now acting as the slave wireless speaker assembly. In certain embodiments, changes in the master/slave designation can be initiated using switch key 250*a, b* through speaker pairing sequence 300 and audio source device pairing sequence 400.

In certain embodiments, pairing sequences 300 and 400 begin with power on step 310 and 410, respectively, which can each be each initiated by pressing and/or holding switch key 250 of the intended master wireless speaker assembly, here 200*a*, for various time periods. For instance, pairing sequence 300 can be initiated by power on step 310 comprising pressing and/or holding switch key for about 1 second, about 2 seconds, about 3 seconds, about 4 seconds, about 5 seconds, about 8 seconds or about 10 seconds. Similarly, pairing sequence 400 can be initiated by power on step 410 comprising pressing and/or holding switch key for about 1 second, about 2 seconds, about 3 seconds, about 4 seconds, about 5 seconds, about 8 seconds or about 10 seconds.

In exemplary and non-limiting embodiments, wireless speaker assembly 200*a* can initiate a speaker pairing sequence 300 with wireless speaker assembly 200*b* after a capacitive touch is maintained with switch key 250*a* for 3 seconds, causing wireless speaker 200*a* to enter TWS pairing mode 312. Wireless speaker assembly 200*a* can then search for a potential TWS pair in step 314, such as a wireless speaker assembly 200*b*, automatically initiating power on step 310*b* upon detection. Wireless speaker assembly 200*b* is thereby paired as the slave wireless speaker assembly with first wireless speaker assembly 200*a* in step 316. Upon confirming success of pairing step 316, pair success messages 320*a* and 320*b* are played by each of the paired speaker assemblies.

Figure 4:
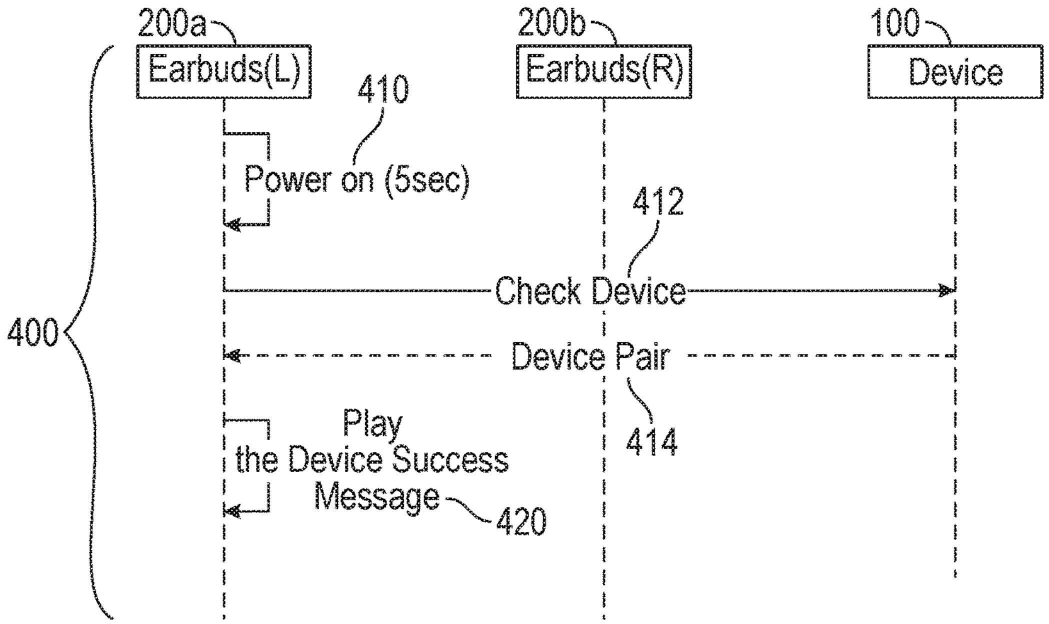
FIG. 4 is a flow diagram demonstrating a method for initially pairing a first wireless speaker assembly with an audio source device.

Once wireless speaker assembly 200*a, b* have been paired in a master/slave arrangement, source pairing sequence 400, an embodiment of which is depicted in FIG. 4, can be used to pair master wireless speaker assembly 200*a* with audio source device 100 in a similar manner. For instance, power on step 410, conducted by maintaining capacitive touch on switch key 250*a* for an appropriate time period can prompt master wireless speaker assembly 200*a* to perform audio source device search 412. Upon identifying a potential audio source device, the device can be paired in pairing step 414, followed by the master wireless speaker assembly playing device pair success message to inform the user that audio source device 100 is successfully paired.

Pairing sequences 300 and 400 can be conducted in any order, depending on the user's preference, although in embodiments where wireless speaker assemblies 200 have identical hardware and can flexibly serve as either the master or slave, the master/slave designation can be assigned dependent on which wireless speaker assembly is used to initiate TWS pairing sequence 300. As noted above, certain embodiments of the wireless speaker system may comprise wireless earphones 200*a* and 200*b* that are specifically designed to seat within a user's left or right ear. Therefore, in view of the discussion above, it should be apparent that the master/slave designation is not dependent on a fixed left/right designation of any wireless speaker assembly disclosed herein. Moreover, left and right channel audio data can be transposed between wireless speaker assembly 200*a, b* independently of the master/slave relationship (i.e., flexible audio routing).

Figure 5:
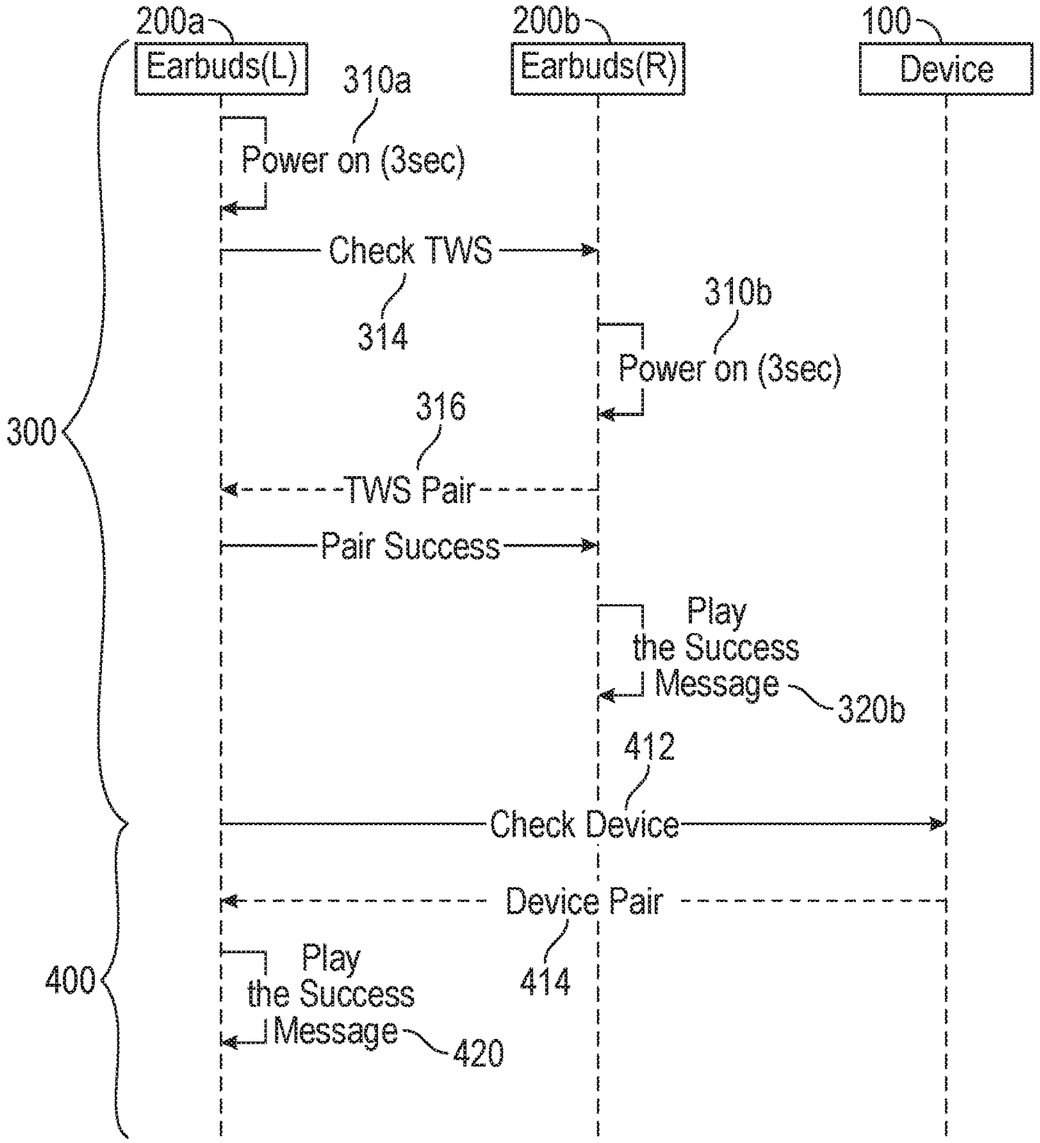
FIG. 5 is a flow diagram demonstrating a method for reestablishing previous pairings of a first wireless speaker assembly with a second wireless speaker assembly and an audio source device from a powered off state.
Figure 6:
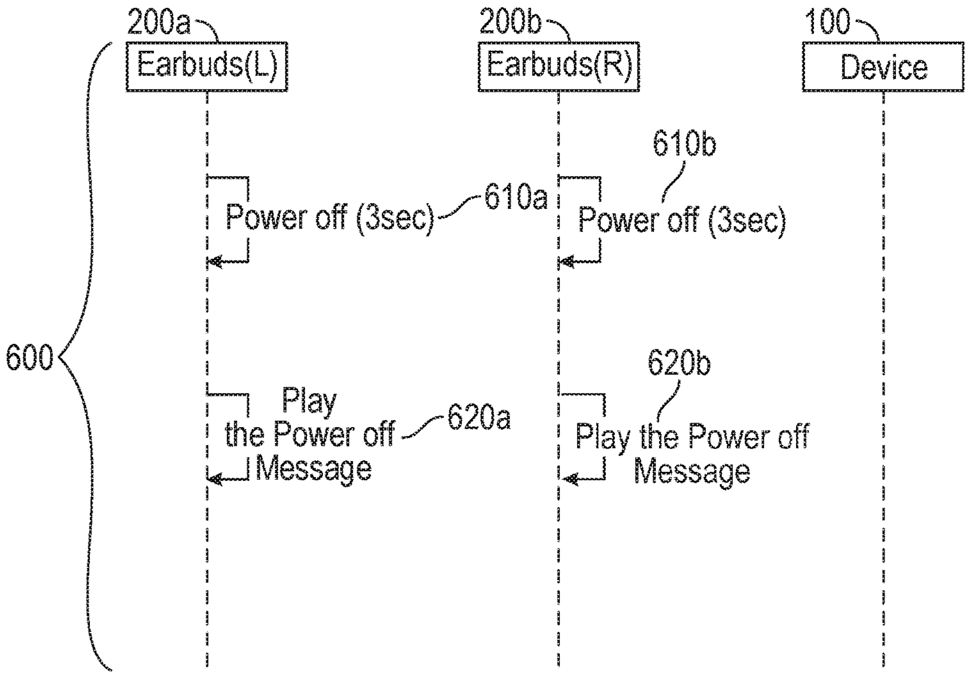
FIG. 6 is a flow diagram demonstrating a method for reestablishing previous pairings of a first wireless speaker assembly with a second wireless speaker assembly and an audio source device from a powered off state.

Once initial successful pairing sequences 300 and 400 are completed, a subsequent powering on of wireless speaker assembly 200*a* can perform pairing sequences 300 and 400 in sequential order, playing success message 320*b* once wireless speaker assembly 200*b* is paired, and playing success message 420 once audio source device 100 is paired. As shown in FIG. 5, each of the wireless speaker assemblies 200 can be independently powered off through switch key 250, indicated by power off message 620*a, b*.

In addition to providing a wireless speaker system able to reliably recognize audio source devices and maintain wireless communication (e.g., through serial communication established via pairing sequences 300 and 400), wireless speaker systems must also provide synchronous playback to achieve an enjoyable user experience. Thus, in certain embodiments, wireless speaker assembly 200*a*, acting as master, can unidirectionally receive audio data from audio source device 100, which may further comprise an output timestamp to indicate the time of transmission from audio source device 100. The received audio data can comprise Advanced Audio Distribution Profile (A2DP) data, including dual-channel stereo audio data. The received audio data can further comprise Audio/Video Remote Control Profile (AVRCP) data that may contain information related to volume control, trim gain related to an individual audio source device and/or wireless speaker assembly, equalizer data, playback controls such as pause, play, reverse or advance track, previous or next track. Synchronization of audio streams 500*a, b* extends beyond A2DP data and AVRCP data is similarly synchronized so that changes in volume can be reflected simultaneously and dynamically in each wireless speaker assembly, despite the variable inherent latency resulting from the serial connection to audio source device 100. Further, the audio routing of left and right channels is similarly flexible and dynamic during use, as each wireless speaker assembly independently renders the audio data.

Wireless speaker assembly 200*a* can also return AVRCP data to audio source device 100 to allow control over source device from the wireless speaker assembly such as to allow notification and response to incoming calls, as well as displaying attributes of the wireless speaker system on the audio source device, such as remaining charge in linked wireless speaker assemblies 200. Referring again to FIG. 1, the A2DP audio data follows a unidirectional serial communication from audio source device 100 to wireless speaker assembly 200*a*, acting as master, to wireless speaker assembly 200*b*, acting as slave. Thus, audio source device 100 has no direct communication with slave wireless speaker assembly 200*b* and relies on the master speaker assembly 200*a* to forward audio source data to slave wireless speaker assembly 200*b*.

Accordingly, in order to maintain low latency with the audio source device and provide tightly synchronized playback, each of wireless speaker assemblies 200 must separately render the stereo audio after receiving the audio source data, by use of any suitable method, including any high-performance stereo audio codec. Transmission of the audio data and subsequent rendering by wireless speaker assemblies 200 necessarily results in an inherent and variable latency for each wireless speaker assembly. In certain embodiments, audible playback 500*a, b* is synchronized in spite of this variable latency through implementation of a synchronization delay that is fixed relative to an output timestamp within the audio source data. For instance, upon receiving timestamped audio data from audio source device 100, the digital signal processer of wireless speaker assembly 200*a* can define a fixed latency prior to audible playback 500*a, b*, and further relay a sample playback rate within the timestamped audio data to wireless speaker assembly 200*b*. Upon receipt of the audio data, wireless speaker assembly 200*b* can separately render the audio data and queue the rendered audio data for playback considering both the fixed latency period relative to the timestamped audio data received by each wireless speaker assembly.

In this manner, the variable latency between multiple wireless speaker assemblies in serial communication can be encompassed by the synchronization delay and separately rendered and transmitted audio data can result in synchronized audible playback 500*a, b*. Accordingly, it is necessary that the synchronization delay exceed the inherent latency of each component of the wireless speaker system. Thus, although the inherent latency is not restricted to any particular range, in certain embodiments, the inherent latency can be in a range from about 10 ms to about 500 ms, from about 20 ms to about 300 ms, from about 30 ms to about 200 ms, or from about 50 ms to about 150 ms. As a result, in certain embodiments, the synchronization delay can be less than about 2 sec, less than about 1 sec, less than about 800 ms, less than about 500 ms, less than about 300 ms, or less than about 200 ms. The synchronization delay can be in a range from about 30 ms to about 1 sec, from about 30 ms to about 500 ms, from about 50 ms to about 800 ms, from about 100 ms to about 500 ms, from about 100 to about 300 ms, or from about 200 ms to about 400 ms. Generally, a shorter synchronization delay will provide a more responsive feel to the wireless speaker system.

Moreover, matching the sample rate between wireless speaker assemblies 200, along with the synchronization delay, provides an unexpected synchronization of audible playback 500*a, b*. In certain embodiments, audible playback 500*a, b* is synchronized to a variance of less than about 50 ms, less than about 30 ms, less than about 10 ms, less than about 5 ms, less than about 3 ms, less than about 1 ms, less than about 0.1 ms, less than about 0.05 ms, less than about 0.03 ms, or less than about 0.01 ms. Synchronization of audible playback 500*a, b* is thus be achieved to a variance of less than about 100 samples, less than about 50 samples, less than about 20 samples, less than about 10 samples, less than about 6 samples, or less than about 3 samples.

We claim:

1. A wireless speaker system comprising:
- a first wireless earphone comprising:
  - a first speaker; and
  - a wireless transceiver configured to receive timestamped audio source data from an audio source device, generate a synchronization delay based on the timestamped audio source data, transmit the audio source data and synchronization delay, and decompress the timestamped audio source data for playback through the first speaker; and
- a second wireless earphone comprising:
  - a second speaker; and
  - a wireless transceiver configured to receive the timestamped audio source data and the synchronization delay from the first wireless earphone and decompress the timestamped audio source data for playback through the second speaker;

wherein:
- an inherent latency of the wireless speaker system is less than about 500 ms; and
- the synchronization delay is greater than or equal to the inherent latency of the wireless speaker system.

2. The wireless speaker system of claim 1, wherein each wireless transceiver comprises hardware compliant with Bluetooth v4.0 specifications.

3. The wireless speaker system of claim 2, wherein each wireless transceiver is a Bluecore® CSR8670™ chip.

4. The wireless speaker system of claim 1, wherein the audio source device is a smartphone, a music server available through a wireless data access point, a laptop, or a tablet.

5. The wireless speaker system of claim 4, wherein the audio source device is a smartphone.

6. The wireless speaker system of claim 1, where in the first wireless earphone further comprises a port to optionally receive audio source data from an audio source device through a wired connection.

7. The wireless speaker system of claim 1, wherein the first wireless earphone and/or second wireless earphone further comprises a microphone.

8. The wireless speaker system of claim 1, wherein the first wireless earphone and/or the second wireless earphone comprise a switch key on an external facing portion of the wireless earphone.

9. The wireless speaker system of claim 8, wherein the switch key is configured to respond to capacitive touch or pressure.

10. The wireless speaker system of claim 1, further comprising a storage case configured to seat the first wireless earphone and the second wireless earphone.

11. The wireless speaker system of claim 10, wherein the storage case is further configured to recharge a battery of the first wireless earphone and/or a battery of the second wireless earphone from a rechargeable power bank battery when the first wireless earphone and/or the second wireless earphone are stored in the storage case.

12. The wireless speaker system of claim 11, wherein the storage case comprises a micro-USB input coupled to the rechargeable power bank battery.

13. A method of synchronously playing audio through a wireless speaker system comprising a plurality of wireless speaker assemblies, the method comprising:
- pairing a first wireless speaker assembly to an audio source device;
- pairing a second wireless speaker assembly to the first wireless speaker assembly, wherein the second wireless speaker assembly is designated the slave in a master/slave configuration with the first wireless speaker assembly;
- receiving, at the first wireless speaker assembly, audio source data from the audio source device;
- transmitting at least a portion of the audio source data from the first wireless speaker assembly to the second wireless speaker assembly;
- separately decompressing at least a portion of the audio source data on each of the first and second wireless speaker assemblies, respectively; and
- synchronizing the decompressed audio source data at the first and second wireless speaker assemblies, the synchronization comprising:
  - delaying playback of the decompressed audio source data at the first wireless speaker assembly and playback of the decompressed audio source data at the second wireless speaker assembly by a synchronization delay, the synchronization delay being fixed relative to an output timestamp embedded in the audio source data; and matching a sample playback rate of the decompressed audio source data at the second wireless speaker assembly to that of the first wireless speaker assembly; wherein the synchronization delay is greater than or equal to an inherent latency of the wireless speaker system;

the inherent latency of the wireless speaker system is less than about 500 ms; and the playback of the decompressed audio source data by the first and second wireless speaker assemblies is synchronized to a variance of less than about 10 ms or less than about 100 samples.

14. The method of claim 13, wherein the first and second wireless speaker assemblies are wireless earphones.

15. The method of claim 13, wherein the playback of the decompressed audio source data by the first and second wireless speaker assemblies is synchronized to a variance of less than about 1 ms or less than about 20 samples.

16. The method of claim 13, wherein the audio source data further comprises volume data, track selection data, pause/play data, equalizer data, trim gain data, or any combination thereof.

17. The method of claim 13, wherein:

audio source data comprises stereo audio data; and the playback of the decompressed audio source data by the first and second wireless speaker assemblies independently comprises left channel audio data or right channel audio data.

18. The method of claim 13, wherein at least one pairing step is initiated through detection of capacitive touch by a switch key disposed on the first and/or second wireless speaker assembly.

* * * * *